(12) United States Patent
Kasturi et al.

(10) Patent No.: US 9,670,845 B2
(45) Date of Patent: Jun. 6, 2017

(54) HYBRID TURBOMACHINE ENCLOSURE

(71) Applicant: General Electric Company, Schenectady, NY (US)

(72) Inventors: Kiran Swarup Kasturi, Karnataka (IN); Antoine Hochar, Belfort (FR); Dinesh Venugopal Setty, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 730 days.

(21) Appl. No.: 13/960,155

(22) Filed: Aug. 6, 2013

(65) Prior Publication Data

US 2014/0311160 A1    Oct. 23, 2014

(30) Foreign Application Priority Data

Apr. 19, 2013   (FR) ...................... 13 53598

(51) Int. Cl.
| | |
|---|---|
| *F16M 1/04* | (2006.01) |
| *E04H 5/02* | (2006.01) |
| *F02C 7/20* | (2006.01) |
| *F02C 7/00* | (2006.01) |
| *F16M 9/00* | (2006.01) |

(52) U.S. Cl.
CPC ............... *F02C 7/20* (2013.01); *E04H 5/02* (2013.01); *F02C 7/00* (2013.01); *F16M 9/00* (2013.01); *Y10T 29/49229* (2015.01)

(58) Field of Classification Search
CPC ............... E04H 1/1238; E04B 1/34321; E04B 1/34315; F02C 7/24
See application file for complete search history.

(56) References Cited

U.S. PATENT DOCUMENTS

| | | | |
|---|---|---|---|
| 3,612,598 A | 10/1971 | Keslin et al. | |
| 3,820,292 A * | 6/1974 | Fitzpatrick ............ | E04B 1/3211 52/81.5 |
| 3,885,362 A * | 5/1975 | Pollock ................. | E04B 1/8218 49/310 |
| 4,085,660 A | 4/1978 | Yoshinouchi et al. | |

(Continued)

FOREIGN PATENT DOCUMENTS

| | | | |
|---|---|---|---|
| CA | 2445031 A1 * | 10/2002 | ............... A01G 9/16 |
| DE | 102008044434 A1 | 2/2009 | |

(Continued)

OTHER PUBLICATIONS

Van de Lindt et al., Performance-Based Seismic Design of Wood Frame Buildings Using a Probabilistic System Identification Concept., Journal of Structural Engineering. 2008.*

(Continued)

*Primary Examiner* — Christine T Cajilig
(74) *Attorney, Agent, or Firm* — Ernest G. Cusick; Hoffman Warnick LLC

(57) ABSTRACT

A hybrid turbomachine enclosure includes a plurality of walls interconnected to form an interior configured and disposed to receive a turbomachine, the plurality of walls including a first wall having a panel on frame construction and a hybrid wall including a first portion having a panel on frame structure and a second portion having a stiffened frame panel structure.

11 Claims, 3 Drawing Sheets

(56) References Cited

U.S. PATENT DOCUMENTS

| | | | | |
|---|---|---|---|---|
| 4,120,376 A * | 10/1978 | Palmer | ............... | E04B 1/8218 181/204 |
| 4,258,511 A * | 3/1981 | Strain | ............... | E04B 1/8218 52/270 |
| 4,272,930 A * | 6/1981 | Foster | ............... | E04B 1/10 52/271 |
| 4,567,956 A | 2/1986 | Matsuda et al. | | |
| 4,677,797 A * | 7/1987 | Roth | ............... | E04B 1/34321 52/282.3 |
| 4,739,597 A * | 4/1988 | Voegeli | ............... | E04B 1/34315 52/223.7 |
| 4,858,398 A * | 8/1989 | Ricchini | ............... | E04B 1/34315 52/288.1 |
| 4,891,919 A * | 1/1990 | Palibroda | ............... | E04B 1/34321 52/79.5 |
| 5,447,000 A * | 9/1995 | Larsen | ............... | E04B 1/34315 52/234 |
| 6,253,552 B1 | 7/2001 | Peletz, Jr. | | |
| 6,357,221 B1 | 3/2002 | Schroeder et al. | | |
| 6,415,558 B1 * | 7/2002 | Cherry | ............... | E04H 9/14 292/138 |
| 6,470,689 B2 | 10/2002 | Schroeder et al. | | |
| 6,477,843 B2 | 11/2002 | Schroeder et al. | | |
| 8,001,730 B2 | 8/2011 | Wallance | | |
| 9,157,249 B2 * | 10/2015 | Segall | ............... | E04H 1/1205 |
| 2002/0020122 A1 * | 2/2002 | Mueller | ............... | E04B 1/26 52/167.3 |
| 2007/0289230 A1 * | 12/2007 | Schroeder, Sr. | ............... | E04H 9/14 52/149 |
| 2009/0044480 A1 * | 2/2009 | Bonds | ............... | E04B 5/40 52/653.2 |
| 2009/0049842 A1 | 2/2009 | Canham et al. | | |
| 2009/0165401 A1 * | 7/2009 | Smalley, III | ............... | E04B 1/34315 52/91.3 |
| 2010/0005806 A1 | 1/2010 | Donnelly | | |
| 2012/0073215 A1 | 3/2012 | Zhang et al. | | |
| 2012/0085062 A1 * | 4/2012 | Neumayr | ............... | E04C 2/3405 52/578 |
| 2012/0304549 A1 * | 12/2012 | Rutledge | ............... | E04B 1/34315 52/16 |
| 2012/0317904 A1 * | 12/2012 | Hartmann | ............... | 52/220.1 |
| 2014/0123572 A1 * | 5/2014 | Segall | ............... | G09B 9/003 52/79.5 |

FOREIGN PATENT DOCUMENTS

| | | |
|---|---|---|
| FR | 2792168 A1 | 10/2000 |
| FR | 2965293 A1 | 3/2012 |

OTHER PUBLICATIONS

FR Search Report and Written Opinion dated Jan. 28, 2014, issued in connection with corresponding FR Application No. FR 1353598.

* cited by examiner

HYBRID TURBOMACHINE ENCLOSURE

CROSS REFERENCE TO RELATED APPLICATION

This application claims the benefit of priority of French Application No. 1353598 filed Apr. 19, 2013, the disclosure of which is incorporated herein by reference in its entirety.

BACKGROUND OF THE INVENTION

The subject matter disclosed herein relates to enclosures and, more particularly, to a hybrid turbomachine enclosure.

Many turbomachines are housed in enclosures that provide protection from the elements. The enclosures are generally designed to provide access to a turbomachine for maintenance. Typically, the enclosure is configured to be at least partially disassembled to facilitate removal of turbomachine components for repair and/or replacement. Generally, the enclosures take the form of a panel on frame design, or a shear panel design. A panel on frame design starts with an underlying frame structure that is covered by a number of panels. The panels are joined to the frame structure using mechanical fasteners. In contrast, a shear panel design incorporates stiffening elements that are welded to the panels themselves. The panel elements are then interconnected with mechanical fasteners to form the enclosure.

BRIEF DESCRIPTION OF THE INVENTION

According to one aspect of an exemplary embodiment, a hybrid turbomachine enclosure includes a plurality of walls interconnected to form an interior configured and disposed to receive a turbomachine, the plurality of walls including a first wall having a panel on frame construction and a hybrid wall including a first portion having a panel on frame structure and a second portion having a shear panel structure.

According to another aspect of an exemplary embodiment, a hybrid turbomachine enclosure includes a first wall having a panel on frame structure. The first wall includes a first end and an opposing second end. A second wall includes a first portion having a panel on frame construction and a second portion including a shear panel construction. The second wall includes a first end portion and a second end portion. A third wall joining the second end of the first wall and the second end portion of the second wall.

According to yet another aspect of an exemplary embodiment, a method of forming a turbomachine enclosure includes constructing a first frame for a first wall, constructing a second frame for a first portion of a second wall, constructing a third frame for a third wall interconnecting the first wall and the first portion of the second wall, attaching panels to the first frame, the second frame, and the third frame, and connecting a shear panel to the second frame to form a second portion of the second wall.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
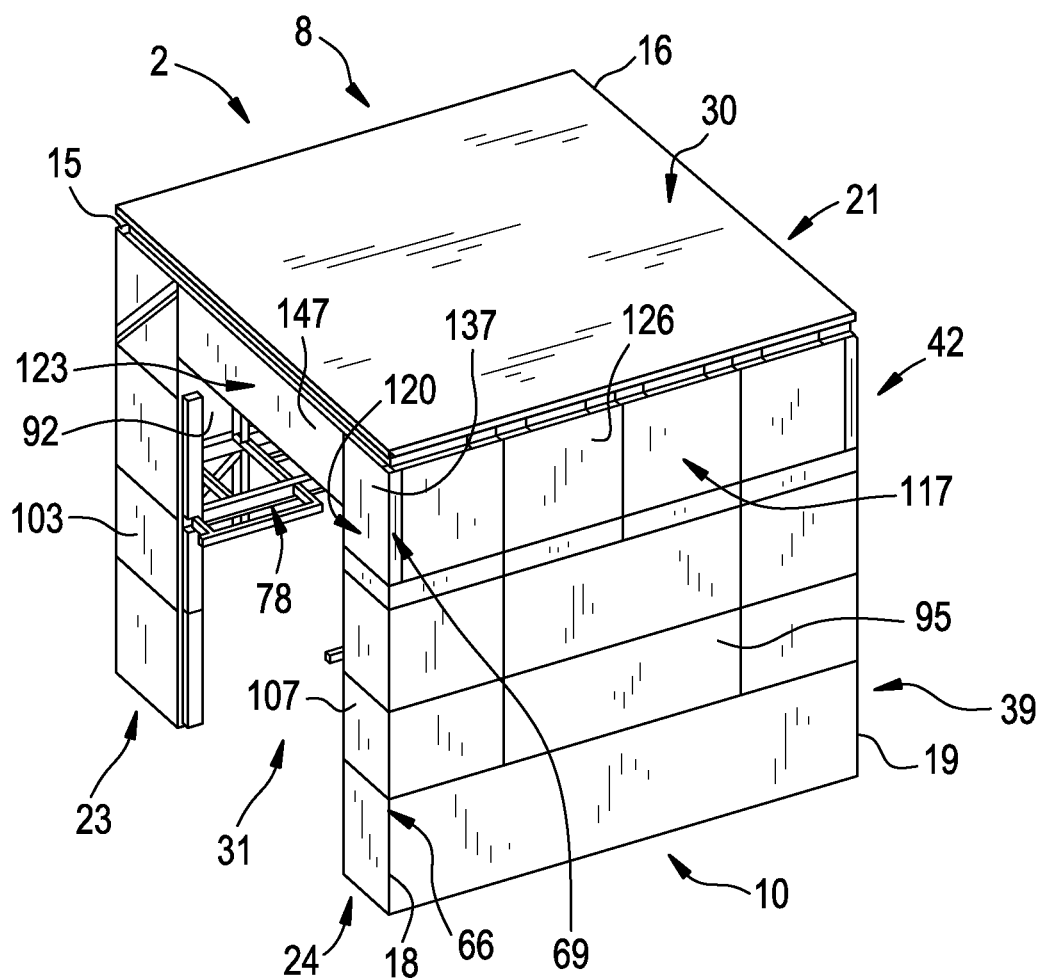
FIG. 1 is a perspective view of a hybrid turbomachine enclosure in accordance with an exemplary embodiment.

A hybrid turbomachine enclosure constructed in accordance with an exemplary embodiment is indicated generally at 2 in FIG. 1. Hybrid turbomachine enclosure 2 includes a first wall 8, and an opposing second wall 10. First wall 8 includes a first end 15 and a second end 16. Second wall 10 includes a first end portion 18 and a second end portion 19. A third wall 21 connects second end 16 of first wall 8 with second end portion 19 of second wall 10. A first opening defining wall 23 extends from first end 15 of first wall 8 toward second wall 10. A second opening defining wall 24 extends from first end portion 18 of second wall 10 toward first wall 8. As will be discussed more fully below, first opening defining wall 23 is connected to second opening defining wall 24 while at the same time defining a gap that may be closed by, for example, a door (not shown). Hybrid turbomachine enclosure 2 is also provided with a roof 30 that covers an interior 31 defined by first, second, and third walls 8, 10, and 21 together with first and second opening defining walls 23 and 24. As will become more fully evident below, hybrid turbomachine enclosure 2 includes a panel on frame construction and a stress panel construction. The term "hybrid" denotes the combination of panel on frame, and improvised stiffened frame with panel construction [which has shear panel advantages] in forming hybrid turbomachine enclosure 2.

Figure 2:
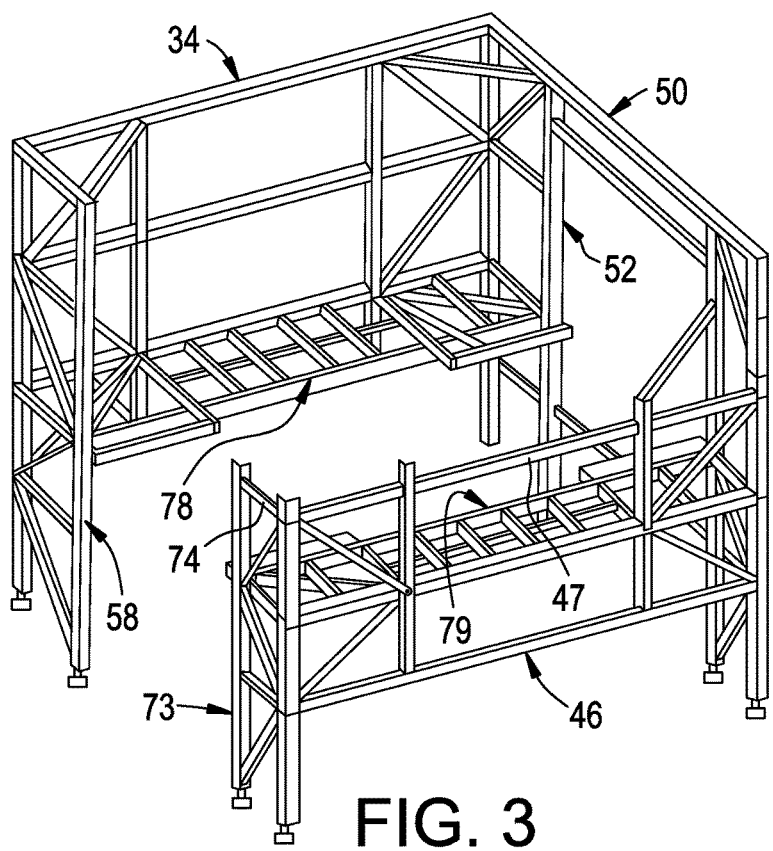
FIG. 2 is a perspective view of a frame of the hybrid turbomachine enclosure of FIG. 1.

As shown in FIG. 2, first wall 8 is formed from a panel on frame construction and includes a first frame 34. Second wall 10 is formed from a hybrid construction including a first portion 39 and a second portion 42 (FIG. 1). First portion 39 is formed from a panel on frame construction and includes a second frame 46 including a shear panel support member 47. Third wall 21 is formed from a panel on frame construction and includes a third frame 50. Third frame 50 includes an opening 52 that may define a window. First opening defining wall 23 is formed from a panel on frame construction and includes an opening defining frame 58. Second opening defining wall 24 is formed from a hybrid construction including a first section 66 and a second section 69. First section 66 is formed from a panel on frame construction and includes an opening defining frame section 73 having a shear panel support member 74. Hybrid turbomachine enclosure 2 is also shown to include various walk ways, two of which are indicated at 78 and 79 supported from first frame 34 and second frame 46 respectively.

Figure 3:
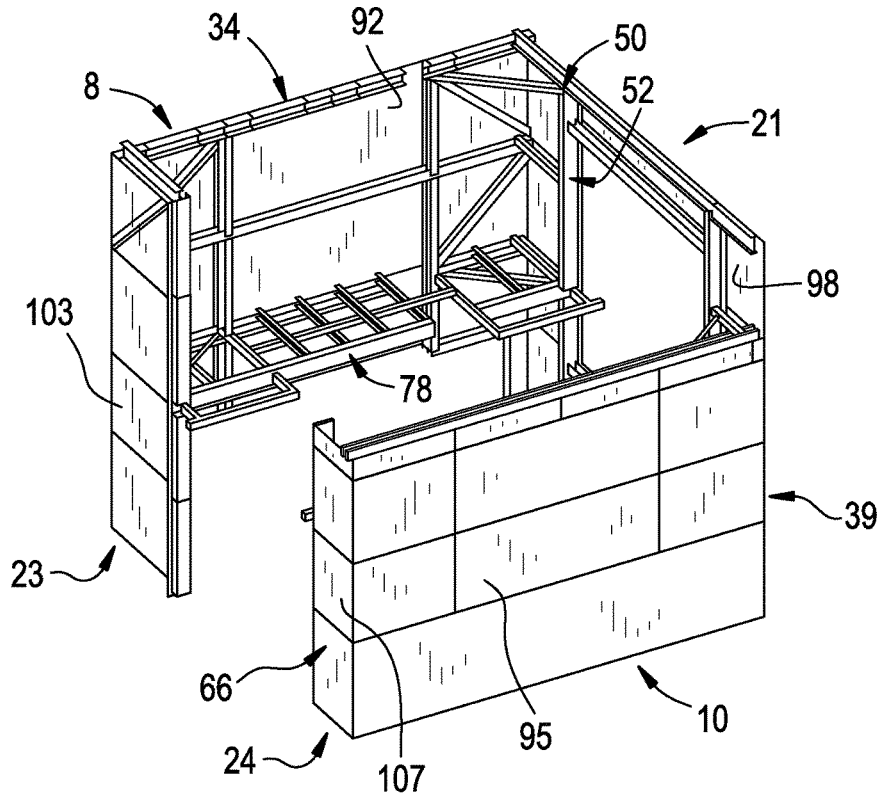
FIG. 3 is a perspective view of the hybrid turbomachine enclosure of FIG. 1 illustrating panels mounted to the frame portion of FIG. 2.
Figure 4:
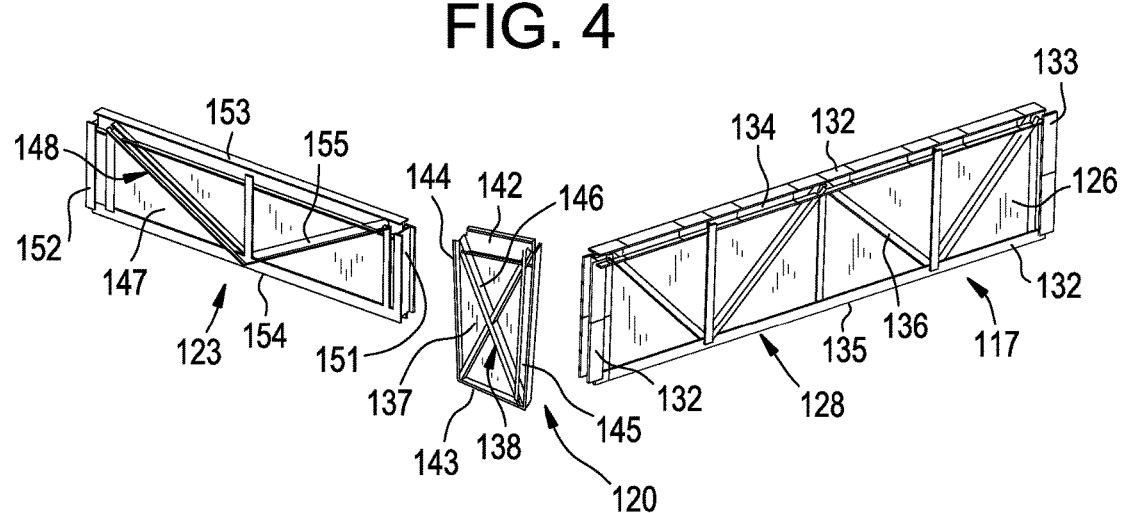
FIG. 4 is a perspective view of a plurality of shear panels of the hybrid turbomachine enclosure of FIG. 1.

One or more panels 92 are connected to first frame 34 as shown in FIG. 3. Panels 92 may be connected to first frame 34 using a variety of techniques including mechanical fasteners, welding and the like. In addition to panels 92, one or more panels 95, and one or more panels 98 are mounted to respective ones of second frame 46 and third frame 50. Panel 103 are also mounted to opening defining frame 58 and panels 107 are mounted to opening defining frame section 73. Panels 95, 98, 103, and 107 may be connected in a manner similar to that used to connect panels 92. Hybrid turbomachine enclosure 2 includes a plurality of shear panels. More specifically, hybrid turbomachine enclosure 2 includes a first shear panel 117, a second shear panel 120 and a third shear panel or linking wall 123 illustrated in FIG. 4.

The term shear panel in accordance with the exemplary embodiment should be understood to describe a member having an outer skin supported to an individual frame by mechanical fasteners. In contrast, prior art shear panels include a welded connection that joins an outer skin to a frame. First shear panel 117 includes an outer skin 126 supported to a shear panel frame 128 by mechanical fasteners (not shown). Shear panel frame 128 includes first and second end beams 132 and 133 joined by first and second connecting beams 134 and 135. Stiffening members, one of which is shown at 136, extend between and connect with first and second end beams 132 and 133 and first and second connecting beams 134 and 135. First and second end beams 132 and 133 first and second connecting beams 134 and 135 provide an interface to adjacent structure.

Similarly, second shear panel 120 includes an outer skin 137 supported to a shear panel frame 138 by mechanical fasteners (not shown). Shear panel frame 138 includes first and second end beams 142 and 143 joined by first and second connecting beams 144 and 145. Stiffening members, one of which is shown at 146, extend between and connect with first and second end beams 142 and 143 and first and second connecting beams 144 and 145. First and second end beams 142 and 143 and first and second connecting beams 144 and 145 provide an interface to adjacent structure. Likewise, third shear panel 123 includes an outer skin 147 supported to a shear panel frame 148 by mechanical fasteners (not shown). Shear panel frame 148 includes first and second end beams 151 and 152 that are joined by first and second connecting beams 153 and 154. Stiffening members, one of which is shown at 155, extend between and connect with first and second end beams 151 and 152 and first and second connecting beams 153 and 154. First and second end beams 151 and 152 and first and second connecting beams 153 and 154 provide an interface to adjacent structure.

Figure 5:
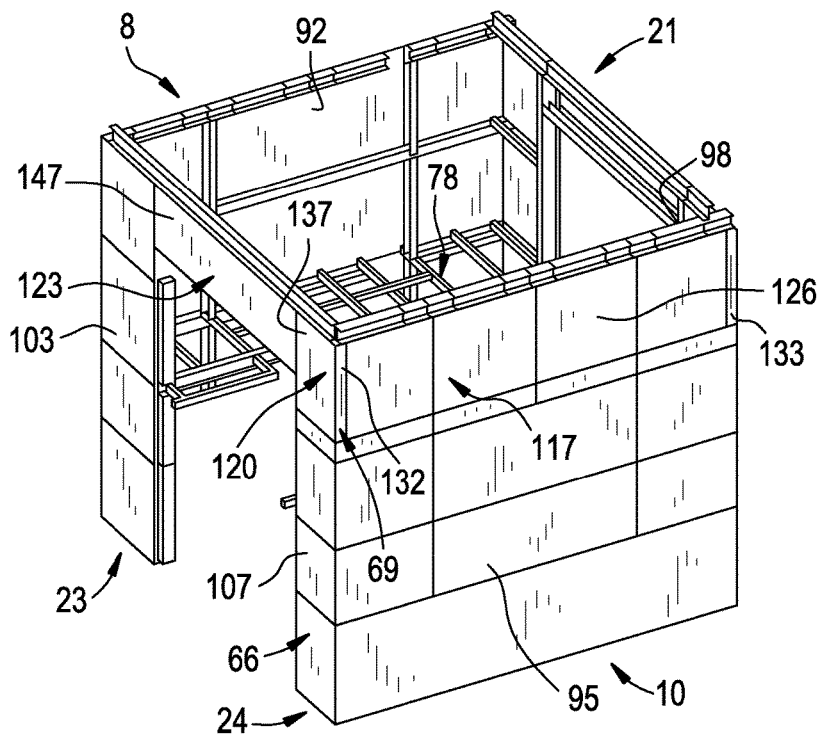
FIG. 5 is a perspective view of the hybrid turbomachine enclosure of FIG. 1, illustrating the shear panels mounted to the frame of FIG. 2.

As shown in FIG. 5, first shear panel 117 is readily detachably connected to second frame 46 at shear panel support member 47 while maintaining the stability of the panel 95 and frame 46. Second shear panel 120 is coupled to opening defining frame section 73 at shear panel support member 74 while maintaining the stability of the panel 107 [and opening defining frame section 73 and third shear panel 123 is positioned between second shear panel 120 and opening defining frame 58. With this arrangement, hybrid turbomachine enclosure may be more easily disassembled to remove and/or service a turbomachine. More specifically, after removing roof 30, first, second, and third shear panels 117, 120, and 123 are readily removed to expose interior 31. After exposing interior 31, portions of a turbomachine may be more easily removed or repaired. After repairs are complete, hybrid turbomachine enclosure 2 is simply reconstructed by reconnecting first, second, and third stress panels 117, 120, and 123 and roof 30.

At this point it should be understood that the exemplary embodiments describe an enclosure that includes both panel on frame construction and stress panel construction used to house a turbomachine. It should also be understood that the above described structure is exemplary. The number of shear panels may vary in accordance with the exemplary embodiment. Also the position and number of panel on frame construction elements may vary. Further, it should be understood that the hybrid turbomachine enclosure may be supported on a foundation formed from concrete or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid turbomachine enclosure comprising:
  a plurality of walls interconnected to form an interior configured and disposed to receive a turbomachine, the plurality of walls including:
    a first wall having a panel on frame construction including a first opening defining wall,
    a hybrid wall including;
      a first portion having a panel on frame structure including a first panel element joined to a frame,
      a second portion having a shear panel structure including a second panel element and a stiffening element, the stiffening element attached to the second panel element, and
      a second opening defining wall spaced from the first opening defining wall,
    a linking wall joining the first opening defining wall with the second opening defining wall, the linking wall having a shear panel construction, and
    a second hybrid wall including:
      a first portion having a panel on frame structure, and a shear panel support member, and
      a second portion having a shear panel structure directly connected to the shear panel support member, wherein the shear panel structure of the second portion of the hybrid wall is between the linking wall and the shear panel structure of the second portion of the second hybrid wall.

2. The hybrid turbomachine enclosure according to claim 1, wherein the plurality of walls includes a third wall joining the first wall with the hybrid wall, the third wall including a panel on frame construction.

3. The hybrid turbomachine enclosure according to claim 2, wherein the second portion is detachably connected directly to the shear panel support member of the first portion.

4. The hybrid turbomachine enclosure according to claim 1, wherein the second opening defining wall includes a first portion of the second opening defining wall having a panel on frame construction and a second portion of the second opening defining wall including a shear panel construction.

5. A hybrid turbomachine enclosure comprising:
  a first wall including a panel on frame structure, the first wall including a first end and an opposing second end, and a first opening defining wall;

a hybrid wall including a first portion having a panel on frame construction and a second portion including a shear panel construction, the hybrid wall including a first end portion and a second end portion, and a second opening defining wall;

the panel on frame structure of the first portion comprising a first panel joined to a frame, the shear panel structure of the second portion comprising a second panel element and a stiffening element, the stiffening element attached to the second panel element;

a linking wall having a shear panel construction and extending between the first opening defining wall and the second opening defining wall; and a second hybrid wall including a first portion having a panel on frame structure and a second portion having a shear panel construction, wherein the first portion of the second hybrid wall includes a shear panel support member, wherein the shear panel construction of the second hybrid wall is directly connected to the shear panel support member, and wherein the shear panel construction of the hybrid wall is between the linking wall and the shear panel construction of the second hybrid wall.

6. The hybrid turbomachine enclosure according to claim 5, wherein the second opening defining wall includes a first portion having a panel on frame construction and a second portion including a shear panel construction.

7. The hybrid turbomachine enclosure according to claim 5, further comprising: a roof connected to the first, second, and third walls.

8. A method of forming a hybrid turbomachine enclosure, the method comprising:
constructing a first frame for a first wall, the first wall including a first opening defining wall;
constructing a second frame for a first portion of a second wall, including a first shear panel support member;
constructing a third frame for a third wall interconnecting the first wall and the first portion of the second wall, including a second opening defining wall and a second shear panel support member;
attaching panels to the first frame, the second frame, and the third frame; and
removably connecting a first shear panel to the first shear panel support member to form a second portion of the second wall, the shear panel comprising a panel element and a stiffening element, the stiffening element attached to the panel element; and
removably connecting a second shear panel to the second shear panel support member to form a second portion of the third wall;
removably connecting a third shear panel linking the first opening defining wall and the second opening defining wall,
wherein the second shear panel is between the third shear panel and the first shear panel.

9. The method of claim 8, wherein connecting the first shear panel includes connecting one of first and second end beams and first and second connecting beams provided on the first shear panel with the first shear panel support member provided on the second frame.

10. The method of claim 8, further comprising: constructing an opening defining frame extending from the first wall toward the second wall and an opening defining frame section extending from the second wall toward the first wall, the opening defining frame section having a height substantially equal to the second frame.

11. The method of claim 8, further comprising: mounting a roof to the first, second, and third walls and the stress panel linking the first opening defining wall and the second opening defining wall.

* * * * *